United States Patent
Carswell et al.

(10) Patent No.: US 7,030,076 B2
(45) Date of Patent: Apr. 18, 2006

(54) FABRIC CARE COMPOSITION COMPRISING A BLOCK COPOLYMER HAVING A METHOXYETHYL ACRYLATE CORE POLYMER AND AN ALKYL METHACRYLATE FLANKING POLYMER

(75) Inventors: Robert John Carswell, Merseyside (GB); James Bernard Cooper, Merseyside (GB); Ezat Khoshdel, Merseyside (GB); Euan Stuart Reid, Merseyside (GB); Keith Leslie Rutherford, Chicago, IL (US)

(73) Assignee: Unilever Home & Personal Care USA a division of Conopco, Inc., Greenwich, CT (US)

( * ) Notice: Subject to any disclaimer, the term of this patent is extended or adjusted under 35 U.S.C. 154(b) by 536 days.

(21) Appl. No.: 10/401,454

(22) Filed: Mar. 28, 2003

(65) Prior Publication Data

US 2003/0195136 A1    Oct. 16, 2003

(30) Foreign Application Priority Data

Apr. 3, 2002    (GB)    .................................... 0207742

(51) Int. Cl.
*C11D 3/37* (2006.01)

(52) U.S. Cl. ...................... 510/318; 510/276; 510/287; 510/361; 510/398; 510/434; 8/115.6; 8/137; 525/242; 525/280

(58) Field of Classification Search ................ 8/115.6, 8/137; 525/242, 280; 510/276, 287, 318, 510/361, 398, 434
See application file for complete search history.

(56) References Cited

U.S. PATENT DOCUMENTS

| | | | |
|---|---|---|---|
| 4,818,242 A | | 4/1989 | Burmeister et al. |
| 5,468,477 A | | 11/1995 | Kumar et al. |
| 6,596,034 B1 | * | 7/2003 | Crawford et al. ............. 8/115.6 |
| 6,663,855 B1 | * | 12/2003 | Frechet et al. ............ 424/70.11 |
| 6,685,925 B1 | * | 2/2004 | Frechet et al. ........... 424/70.16 |
| 6,767,968 B1 | * | 7/2004 | Liu et al. ..................... 525/242 |

FOREIGN PATENT DOCUMENTS

| | | |
|---|---|---|
| EP | 0 300 525 | 1/1989 |
| EP | 0 705 900 | 4/1996 |
| JP | 53 139888 | 12/1978 |
| JP | 04 050234 | 2/1992 |
| WO | 96/15309 | 5/1996 |
| WO | 96/15310 | 5/1996 |
| WO | 00/71607 | 5/2000 |
| WO | 00/71606 | 11/2000 |
| WO | 01/38627 | 5/2001 |
| WO | 02/092745 | 11/2002 |

OTHER PUBLICATIONS

Int'l. Search Report No. PCT/EP 03/03322 dated Jul. 3, 2003—3p.
Co-pending U.S. Appl. No. 10/404,611, filed Mar. 28, 2003, Carswell, et al.
UK Search Report GB 0207742.8 dated Jan. 15, 20003—1p.
WPI Derwent Acct. No. 1992-109202/199214 abstract of JP 04 050234—1 p.
WPI Derwent Acct. No. 1979-05013B abstract of JP 53 0139888—1 p.
Rawls et al. *The Relationship Between Polymer Elastic Properties and the Ability to Impart Improved Wrinkle Recovery to Cotton Fabric*, Journal of Applied Polymer Science vol. 15, pp. 341-349 (1971).

* cited by examiner

*Primary Examiner*—Charles Boyer
(74) *Attorney, Agent, or Firm*—Alan A. Bornstein

(57) ABSTRACT

This invention relates to a fabric care composition comprising a thermoplastic elastomer and a textile compatible carrier, a method of treating fabric with such a composition as part of a laundering process and the use of a thermoplastic elastomer or a composition comprising a thermoplastic elastomer to improve the crease recovery properties and/or elasticity and/or shape retention of a fabric.

18 Claims, No Drawings

US 7,030,076 B2

FABRIC CARE COMPOSITION COMPRISING A BLOCK COPOLYMER HAVING A METHOXYETHYL ACRYLATE CORE POLYMER AND AN ALKYL METHACRYLATE FLANKING POLYMER

TECHNICAL FIELD

This invention relates to a fabric care composition comprising a thermoplastic elastomer and a textile compatible carrier, a method of treating fabric with such a composition as part of a laundering process and the use of a thermoplastic elastomer or a composition comprising a thermoplastic elastomer to improve the crease recovery properties and/or elasticity and/or shape retention of a fabric.

BACKGROUND OF THE INVENTION

The laundry process generally has several benefits for fabric, the most common being to remove dirt and stains from the fabric during the wash cycle and to soften the fabric during the rinse cycle. However, there are numerous disadvantages associated with repeated use of conventional laundry treatment compositions and/or the actual laundry process; one of these being a fairly harsh treatment of fabric in the laundry process causing fabric to lose its shape.

One aspect of the present invention is therefore directed towards maintaining the new appearance of fabric, that is to give increased stretch to the fabric and also better return (after being stretched) to the articles original shape (shape retention).

The creasing of fabrics is also an almost inevitable consequence of cleaning fabrics, such as in a domestic laundering process. Fabrics also become creased in wear. Creasing can be a particular problem for fabrics, which contain cellulosic fibres such as cotton, because the creasing is often difficult to remove. Generally, the creases, which are developed in a fabric during laundering, are removed by ironing. However, because ironing is seen as a time consuming chore, there is an increasing trend for fabrics to be designed such that the need for ironing is reduced and/or the effort required for ironing is lower.

Compositions for reducing the wrinkling of fabric are described in WO 96/15309 and WO 96/15310. The compositions contain a silicone and a film-forming polymer and it appears that it is the lubricating effect of the silicone, which is responsible for their anti-wrinkle properties. This conclusion is supported by the fact that a wide variety of polymers is mentioned as being suitable for use in the compositions.

Industrial treatments of fabrics to reduce their tendency to crease are known. JP-A-04-50234 describes a textile treatment in which the crease resistance of a plain weave cotton fabric is increased by applying a so-called "shape memory resin" to the fabric. However, this document teaches that the resin is applied to the fabric at a relatively high amount of 10% by weight on weight of fabric and it is not clear how this level of resin affects other properties of the fabric. Furthermore, treatment of the fabric with the resins is followed by a step of drying at 80° C. and the shape memory function is described as being heat-sensitive, with deformations at normal temperatures being restored to the original shape on heating at a specific temperature.

A relationship between polymer elastic properties and the ability to impart improved wrinkle recovery to cotton fabric is described by Rawls et al in *Journal of Applied Polymer Science*, vol. 15, pages 341–349 (1971). A variety of different elastomers was applied to fabric and, particularly in the few cases where thermoplastic elastomers were used, the polymers were applied to the fabric at the relatively high levels of 4% and above. There is no indication that any benefit would be obtained in applying polymers to the fabric at lower levels and no suggestion as to practical applications of the technique.

The treatment of fabrics with cross-linking agents in order to impart antiwrinkle properties is known. Compounds such as formaldehyde-based polymers, DMDHEU (dimethylol dihydroxy ethylene urea) and BTCA (butyl-1,2,3,4-tetracarboxylic acid) may be used as the cross-linking agent. However, these treatments have the disadvantage of reducing the tensile strength of the fabrics.

International publications nos. WO 00/71606 and WO 00/71607 describe polysiloxane block copolymers which are built up from units of the formula [A] and [B] in which A is a polymeric block built up from radically polymerisable monomer and B is a polysiloxane block. These block copolymers may be used in cosmetic and personal care compositions. However, there is no suggestion that such block copolymers may exhibit fabric care benefits in a laundry composition.

The present invention aims to reduce the tendency for fabrics to become wrinkled or creased.

The invention further aims to reduce the deleterious effects on elasticity and tensile strength of fabrics, which some conventional anti-wrinkle treatments impart. The invention may also provide a degree of shape retention in the fabric.

SUMMARY OF THE INVENTION

In a first aspect, the present invention provides a fabric care composition comprising a thermoplastic elastomer which is a block copolymer comprising a core polymer having a backbone comprising at least a proportion of C—C bonds and/or Si—O bonds and two or more flanking polymers, each flanking polymer being covalently bound to an end of the core polymer, wherein the copolymer is soluble at a level of at least 1% by weight in water or aqueous ethanol at 25°, and a textile compatible carrier.

In a second aspect, the invention provides a method of treating fabric which comprises treating the fabric with a fabric care composition comprising a thermoplastic elastomer as defined above.

In a third aspect, the invention provides the use of a thermoplastic elastomer as defined above or a composition as defined above to improve the crease recovery properties and/or elasticity and/or shape retention of a fabric.

DETAILED DESCRIPTION OF THE INVENTION

The present invention involves the development of polymers for use in compositions for fabric care applications. The compositions comprise a thermoplastic elastomer. The thermoplastic elastomer is a block copolymer comprising a core polymer having a backbore comprising at least a proportion of C—C (ie. carbon-carbon) bonds and/or Si—O (ie. silicon-oxygen) bonds and two or more flanking polymers. The linkages in the backbone of the core polymer may comprise greater than 30%, preferably greater than 50%, more preferably greater than 75%, most preferably greater then 95%, such as, for example, at least 99% (these percentages being by number) C—C and/or Si—O bonds. In some cases, the backbone may contain 100% (by number) C—C and/or Si—O bonds. Other bonds which may be present in the backbone of the core polymer, in addition to the C—C and/or Si—O bonds, include, for example, C—O bonds. The flanking polymers are bound to an end of the core polymer. Preferably, the flanking polymers comprise at least a proportion of C—C (ie, carbon-carbon) bonds. The linkages in the backbone of the flanking polymer preferably comprise greater than 50%, more preferably greater than 75%, most preferably greater then 95%, such as, for example, at least 99% (these percentages being by number) C—C bonds. In some cases, the backbone of the flanking polymer may contain 100% (by number) C—C bonds. Other bonds which may be present in the backbone of the flanking polymer, in addition to the C—C bonds, include, for example, C—O or C—N bonds.

The core polymer can take a number of different forms. For example, the core polymer may be linear, branched, radial or star-shaped (the latter polymers also being termed "aerial"). Star-shaped polymers may have three or more arms. When the core polymer is linear, a flanking polymer is bound to each end of the core polymer and the resulting block copolymer is an ABA block copolymer; this is a preferred embodiment of the present invention. When the core polymer is star-shaped, a flanking polymer is bound to each end of the core polymer and the block copolymer therefore contains as many flanking polymers as there are points or free ends in the star shaped polymer. For example, if the star shaped core polymer has four ends the block copolymer will comprise four flanking polymer groups.

The block copolymer may therefore have the structure $(AB)_n$-Core, where A and B are polymeric blocks, n is 2 or more (preferably 2, or 4, 6, 8 or 12) and Core is a non-polymeric linking core. For ABA block copolymers, there may or may not be a non-polymeric core in the B block, depending on how polymerisation is carried out. In one preferred embodiment of the invention, the A and B blocks are each derived from a single monomer.

Usually, the flanking polymer (such as component A in an ABA block polymer) comprises or consists of a material that is hard at room temperature (ie, it has a high Tg) but becomes soft and fluid upon heating. Such materials are known in the art as "hard" blocks. The core polymer (such as component B in an ABA block copolymer) comprises or consists of a material that is soft at room temperature (ie, it has a low Tg). Materials of this latter type are known in the art as "soft blocks".

The glass transition temperature (Tg) of the flanking polymer (eg, in the case of an ABA block copolymer, the A blocks) is typically from 0 to 300° C., preferably from 25 to 175° C., more preferably from 30 to 150° C. The glass transition temperature of the core polymer (eg, in the case of an ABA block copolymer, the B blocks) is typically from −200 to 150° C., preferably from −150 to 75° C., more preferably from −150 to 50° C. (such as from −150 to less than 30° C.). Those skilled in the art will appreciate that the particular Tg values in any given case will depend on the overall nature of the polymer and the identity of the particular core and flanking polymers. The main requirement is that the flanking polymers will constitute hard blocks, whilst the core polymer will be a soft block. Typically, this means that the Tg of the flanking polymers will be higher than that of the core polymer.

Tg or glass transition is a well-known term in polymer science that is used to describe the temperature at which a polymer or a segment thereof undergoes a transition from a solid or brittle material to a liquid or rubber-like material. The glass transition temperature can be measured by a variety of standard techniques that are well known in polymer science. A common technique for the determination of glass transition temperature is differential scanning calorimetry, commonly known as DSC The glass transition phenomenon in polymers is described in polymer textbooks and encyclopaedias, for example "Principles of Polymer Chemistry", A Ravve, Plenum Press, New York and London 1995, ISBN 0-306-44873-4.

The core and flanking polymer segments are generally thermodynamically incompatible and they will therefore phase separate into multiphase compositions in which the phases are intimately dispersed.

The flanking and core polymers are typically selected in a manner so as to produce a block copolymer with balanced hydrophilic/hydrophobic character. The copolymer may be, for example, soluble in water, ethanol or mixtures thereof or soluble in other textile acceptable diluents or carriers.

The copolymer is soluble in water or aqueous ethanol at a level of at least 1% by weight (more preferably at least 5% by weight, eg, 1 to 25% by weight or 5 to 25% by weight) at 25° C. By soluble, it is meant that the copolymer forms stable micelles that do not phase separate (for example over a period of at least 2 hours, more preferably at least 24 hours) for a 1% (or other specified value) by weight solution in distilled water or aqueous ethanol at 25° C.

The core polymer typically has a number average molecular weight of from 100 to 10,000,000 Da (preferably from 1,000 to 200,000 Da, more preferably from 1,000 to 100,000 Da) and a weight average molecular weight of from 100 to 20,000,000 Da (preferably from 1,000 to 500,000 Da, more preferably from 1,000 to 450,000 Da, even more preferably from 1,000 to 400,000 Da). The flanking polymers preferably have a number average molecular weight of from 80 to 500,000 Da (preferably from 100 to 100,000 Da) and a weight average molecular weight of from 80 to 700,000 Da (preferably from 100 to 250,000 Da, more preferably from 200 to 250,000 Da). The molar ratio of the core polymer to the flanking polymers is typically from 1:10 to 10:1.

The viscosity of the polymer is preferably less than 15 mPas (centipoise; cp), more preferably less than 12 mPas, such as for example in the range from 3 to 12 mPas (cp), as estimated for 5 wt % polymer in 50 vol % aqueous ethanol solution at 25° C. using capillary viscometry and assuming a viscosity for deionised water of 1 mPas.

The block copolymers also preferably have an elastic modulus of less than 0.45 GPa, as determined by the method described herein in the examples in the section under the heading "Method for determining elastic modulus". Preferably, the polymer has an elastic modulus in the range of from 0.01 to 0.45 GPa, more preferably 0.05 to 0.45 GPa, most preferably 0.1 to 0.45 GPa.

Preferably, the polymer consists essentially of (ie, contains at least 95% and preferably substantially 100%) atoms selected from carbon, hydrogen, silicon, oxygen and nitrogen.

Each of the flanking polymers may, independently, comprise the same or different monomers. Hence, the copolymers used in the invention include, for example, ABA and ABC block copolymers.

The flanking polymers in each thermoplastic elastomer are preferably substantially identical in terms of their composition and molecular weight. However, the flanking polymers may, alternatively, be different from each other in terms of their composition and/or molecular weight.

Preferably, the flanking polymer and/or the core polymer, more preferably both the core polymer and the flanking polymer, comprise backbones which are obtainable by free radical polymerisation of vinylic monomers. Suitable vinylic monomers include those based on acrylate/methacrylate, acrylamide and/or styrenic systems. However, other block copolymeric systems such as those derived by, for example, addition polymerisation mechanisms such as polycondensation can also be utilised, provided that the flanking and core polymers are derived from hard and soft segments, respectively.

The block copolymers of the present invention can be produced by standard polymerisation techniques such as anionic or living free radical polymerisation methodologies. Suitable methods for preparing the polymers will be known to those skilled in the art.

Free radically polymerisable monomers suitable for use in polymerisation methods to produce polymers suitable for use in the present invention are preferably ethylenically unsaturated monomers. The living free radical polymerisation route is preferred due to its versatility and commercial viability. By "polymerisable" is preferably meant monomers that can be polymerised in accordance with a living radical polymerisation.

By "ethylenically unsaturated" is meant monomers that contain at least one polymer sable carbon-carbon double bond (which can be mono-, di-, tri- or tetra-substituted). Either a single monomer or a combination of two or more monomers can be utilised. In either case, the monomers are selected to meet the physical and chemical requirements of the final block copolymer.

Suitable ethylenically unsaturated monomers useful herein include protected or non-protected acrylic acid and methacrylic acid and salts, esters, anhydrides and amides thereof.

The acrylic acid and methacrylic acid salts can be derived from any of the common non-toxic metal, ammonium, or substituted ammonium counter ions.

The acrylic acid and methacrylic acid esters can be derived from $C_{1-40}$ straight chain, $C_{3-40}$ branched chain, or $C_{3-40}$ carbocyclic alcohols, from polyhydric alcohols having from about 2 to about 8 carbon atoms and from about 2 to about 8 hydroxyl groups (non-limiting examples of which include ethylene glycol, propylene glycol, butylene glycol, hexylene glycol, glycerin, and 1,2,6-hexanetriol); from amino alcohols (non-limiting examples of which include aminoethanol, dimethylaminoethanol and diethylaminoethanol and their quaternised derivatives); or from alcohol ethers (non-limiting examples of which include methoxyethanol and ethoxyethanol).

The acrylic acid and methacrylic acid amides can be unsubstituted, N-alkyl or N-alkylamino mono-substituted, or N,N-dialkyl, or N,N-dialkylamino disubstituted, wherein the alkyl or alkylamino groups can be derived from $C_{1-40}$ (preferably $C_{1-10}$) straight chain, $C_{3-40}$ branched chain, or $C_{3-40}$ carbocyclic moieties. In addition, the alkylamino groups can be quaternised.

Also useful as monomers are protected and unprotected acrylic or/and methacrylic acids, salts, esters and amides thereof, wherein the substituents are on the two and/or three carbon position of the acrylic and/or methacrylic acids, and are independently selected from $C_{1-4}$ alkyl, hydroxyl, halide (—Cl, —Br, —F, —I), —CN, and —CO$_2$H, for example methacrylic acid, ethacrylic acid, alpha-chloroacrylic acid and 3-cyano acrylic acid. The salts, esters, and amides of these substituted acrylic and methacrylic acids can be defined as described above for the acrylic/methacrylic acid salts, esters and amides.

Other useful monomers include vinyl and allyl esters of $C_{1-40}$ straight chain, $C_{3-40}$ branched chain, or $C_{3-40}$ carbocyclic carboxylic acids, vinyl and allyl halides (eg, vinyl chloride, allyl chloride), (eg, vinyl pyridine, allyl pyridine); vinylidene chloride; and hydrocarbons having at least one unsaturated carbon-carbon double bond (eg, styrene, alpha-methylstyrene, t-butylstyrene, butadiene, isoprene, cyclohexadiene, ethylene, propylene, 1-butene, 2-butene, isobutylene, p-methylstyrene); and mixtures thereof.

Preferred ethylenically unsaturated monomers have the following general formula:

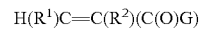

$$H(R^1)C=C(R^2)(C(O)G)$$

in which $R^1$ and $R^2$ are independently selected from hydrogen, $C_1$–$C_{10}$ straight or branched chain alkyl (the term alkyl, when used herein, refers to straight chain and branched groups), methoxy, ethoxy, 2-hydroxyethoxy, 2-methoxyethyl and 2-ethoxyethyl groups;

G is selected from hydroxyl, —O(M)$_{1/v}$, —OR$^3$, —NH$_2$, —NHR$^3$ and —N(R$^3$)(R$^4$);

where M is a counter-ion of valency v selected from metal ions such as alkali metal ions and alkaline earth metal ions, ammonium ions and substituted ammonium ions such as mono-, di-, tri- and tetraalkylammonium ions, and each R$^3$ and R$^4$ is independently selected from hydrogen, $C_1$–$C_8$ straight or branched chain alkyl, glycerol, N,N-dimethylaminoethyl, 2-hydroxyethyl, 2-methoxyethyl, and 2-ethoxyethyl.

More preferred specific monomers useful herein include those selected from protected and unprotected acrylic acid, methacrylic acid, ethacrylic acid, methyl acrylate, ethyl acrylate, ∀-butyl acrylate, iso-butyl acrylate, t-butyl acrylate, 2-ethylhexyl acrylate, decyl acrylate, octyl acrylate, methyl methacrylate, ethyl methacrylate, n-butyl methacrylate, iso-butyl methacrylate, t-butyl methacrylate, 2-ethylhexyl methacrylate, decyl methacrylate, methyl ethacrylate, ethyl ethacrylate, n-butyl ethacrylate, iso-butyl ethacrylate, t-butyl ethacrylate, 2-ethylhexyl ethacrylate, decyl ethacrylate, 2,3-dihydroxypropyl acrylate, 2,3-dihydroxypropyl methacrylate, 2-hydroxyethyl acrylate, 2-hydroxypropyl acrylate, hydroxypropyl methacrylate, glyceryl monoacrylate, glyceryl monoethacrylate, glycidyl methacrylate, glycidyl acrylate, glycerol methacrylate, acrylamide, methacrylamide, ethacrylamide, N-methyl acrylamide, N,N-dimethyl acrylamide, N,N-dimethyl methacrylamide, N-ethyl acrylamide, N-isopropyl acrylamide, N-butyl acrylamide, N-t-butyl acrylamide, N,N-di-n-butyl acrylamide, N,N-diethylacrylamide, N-octyl acrylamide, N-octadecyl acrylamide, N,N-diethylacrylamide, N-phenyl acrylamide, N-methyl methacrylamide, N-ethyl methacrylamide, N-dodecyl methacrylamide, N,N-dimethylaminoethyl acrylamide, quaternised N,N-dimethylaminoethyl acrylamide, N,N-dimethylaminoethyl methacrylamide, quaternised N,N-dimethylaminoethyl methacrylamide, N,N-dimethylaminoethyl acrylate, N,N-dimethylaminoethyl methacrylate (i.e. 2-dimethylaminoethyl methacrylate) quaternised N,N-dimethyl-aminoethyl acrylate, quaternised N,N-dimethylaminoethyl methacrylate, 2-hydroxyethyl acrylate, 2-hydroxyethyl methacrylate, 2-hydroxyethyl ethacrylate, glyceryl acrylate, 2-methoxyethyl acrylate, 2-methoxyethyl methacrylate, 2-methoxyethyl ethacrylate, 2-ethoxyethyl acrylate, 2-ethoxyethyl methacrylate, 2-ethoxyethyl ethacrylate, maleic acid, maleic anhydride and its half esters, fumaric acid, itaconic acid, itaconic anhydride and its half esters, crotonic acid, angelic acid, diallyldimethyl ammonium chloride, vinyl pyrrolidone, vinyl imidazole, methyl vinyl ether, methyl vinyl ketone, maleimide, vinyl pyridine, vinyl pyridine-N-oxide, vinyl furan, styrene sulphonic acid and its salts, allyl alcohol, allyl citrate, allyl tartrate, vinyl acetate, vinyl alcohol, vinyl caprolactam, vinyl acetamide, vinyl formamide and mixtures thereof.

Even more preferred monomers are those selected from methyl acrylate, methyl methacrylate, methyl ethacrylate, ethyl acrylate, ethyl methacrylate, ethyl ethacrylate, n-butyl acrylate, t-butyl acrylate, n-butyl methacrylate, n-butyl ethacrylate, 2-ethylhexyl acrylate, 2-ethylhexyl methacrylate, 2-ethylhexyl ethacrylate, N-octyl acrylamide, 2-methoxyethyl acrylate, 2-hydroxyethyl acrylate, N,N-dimethylaminoethyl acrylate, N,N-dimethylaminoethyl methacrylate, glycerol methacrylate, acrylic acid, methacrylic acid, N-t-butylacrylamide, N-sec-butylacrylamide, N,N-dimethylacrylamide, N,N-dibutylacrylamide, N,N-dihydroxyethylacrylamide, 2-hydroxyethyl acrylate, 2-hydroxyethyl methacrylate, benzyl acrylate, 4-butoxycarbonylphenyl acrylate, butyl acrylate, 4-cyanobutyl acrylate, cyclohexyl acrylate, dodecyl acrylate, 2-ethylhexyl acrylate, heptyl acrylate, iso-butyl acrylate, 3-methoxybutyl acrylate, 3-methoxypropyl acrylate, methyl acrylate, N-butyl acrylamide, N,N-dibutyl acrylamide, ethyl acrylate, methoxyethyl acrylate, hydroxyethyl acrylate, diethyleneglycolethyl acrylate and mixtures thereof.

Particularly preferred for the flanking polymers are polymers or copolymers of an acrylamide eg, N,N-dialkylacrylamides, preferably N,N-dimethylacrylamide. Copolymers include, for example, random copolymers of an acrylamide with one or more other vinylic monomers eg, another acrylamide or an acrylate ester, as described hereinbefore. Representative examples of particularly preferred monomers for the flanking polymers therefore include, but are not restricted to: acrylamide, methacrylamide, N-tert-butylacrylamide, N-sec-butylacrylamide, N,N-dimethylacrylamide, N,N-dibutylacrylamide, N,N-dihydroxyethylacrylamide, acrylic and methacrylic acids and their sodium, potassium, ammonium salts, styrene, styrenesulphonic acid, N,N-dialkylaminoethyl acrylate, N,N-dialkylaminoethyl methacrylate, glycerol methacrylate, N,N-dialkylaminoethyl acrylamide, vinylformamide, tert-butyl acrylate, tert-butyl methacrylate, and, where the flanking polymer is a copolymer, mixtures thereof. N,N-dialkylacrylamides and N-alkylacrylamides, wherein the alkyl groups are $C_1$–$C_8$ straight or branched chain alkyl (particularly N,N-dimethylacrylamide), are the most preferred class of monomers for the flanking polymer, and are preferably used as copolymers with C1–C6 alkyl acrylate or methacrylate esters (such as methyl methacrylate) or acrylic acid when one or both of the flanking polymers is a copolymer.

It is preferred that the core polymer is a polymer or copolymer of an acrylate ester. Copolymers may, for example, be random copolymers of two or more (preferably two) different acrylate esters. Preferred acrylate esters are esters of acrylic acid and $C_1$–$C_8$ straight or branched chain alcohols. Representative examples of monomers for the core polymer include, but are not restricted to: benzyl acrylate, 4-butoxycarbonylphenyl acrylate, butyl acrylate, 4-cyanobutyl acrylate, cyclohexyl acrylate, dodecyl acrylate, 2-ethylhexyl acrylate, heptyl acrylate, iso-butyl acrylate, 3-methoxybutyl acrylate, 3-methoxypropyl acrylate, methyl acrylate, neopentyl acrylate, nonyl acrylate, octyl acrylate, phenethyl acrylate, propyl acrylate, N-butyl acrylamide, N,N-dibutyl acrylamide, ethyl acrylate, methoxyethyl acrylate, hydroxyethyl acrylate, diethyleneglycolethyl acrylate. More preferred are polymers or copolymers of a (C1–C3 alkoxy)C1–C6 alkyl acrylate. Particularly preferred core polymers are polymers or copolymers of (2-methoxyethyl) acrylate. The copolymers may be copolymers of (2-methoxyethyl) acrylate with $C_1$ to $C_6$ alkyl acrylate esters such as, for example, t-butyl acrylate.

Other preferred core polymers include polymers or copolymers of $C_{2-4}$ alkylene glycols, especially poly(ethylene glycol).

Alternatively, preferred core polymers may include polysiloxanes having nucleophilic end-groups which may be linear, branched or hyperbranched, provided they have at least one nucleophilic end-group as described above. Typically, such an end-group is one capable of nucleophilic attack via its O, N or S atom.

Examples of preferred polysiloxanes have the formula

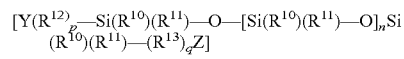

in which n is an integer from 5 to 1,000,000;
$R^{10}$ and $R^{11}$ are independently selected from monovalent, optionally substituted, linear or branched $C_{1-18}$ hydrocarbon radicals as described above;
$R^{12}$ and $R^{13}$ are independently selected from divalent, optionally substituted, linear or branched $C_{1-18}$ hydrocarbon radicals as described above;
p and q are integers having a value of 0 or 1, and
Y and Z are independently selected from hydroxyl, —$NH_2$ and —$NHR^{14}$ where $R^{14}$ is a monovalent, optionally substituted, linear or branched $C_{1-18}$ hydrocarbon radical as defined above, with the proviso that, either, but not both, of Y and Z may also be hydrogen or a monovalent, optionally substituted, linear or branched $C_{1-18}$ hydrocarbon radical as defined above, thereby giving a mono-end-capped polysiloxane.

Particularly preferred polysiloxanes corresponding to the above general formula have:
n 5 to 1,000,000, preferably 5 to 500;
$R^{10}$ and $R^{11}$=methyl,
p and q=0 and Y and Z=hydroxyl; or p and q=1, $R^{12}$ and $R^{13}$=$(CH_2)_3$ and Y and Z=$NH_2$.

Polydimethylsiloxane is particularly preferred as a core polymer.

Preferably, the block copolymer of the invention contains up to 85% by weight of the flanking polymers, based on flanking and core polymers. More preferably, the block copolymer contains from 20% to 85% by weight of the flanking polymers.

In the block copolymers of the invention, each of the core and flanking polymers is preferably derived from a single monomer.

The core polymer is preferably a polymer of (2-methoxyethyl) acrylate or ethylene glycol or is polydimethylsiloxane. (2-Methoxyethyl)acrylate polymers are especially preferred. Preferably, the flanking polymers are polymers of glycerol methacrylate, 2-dimethylaminoethyl methacrylate or, especially N,N-dimethyl acrylamide. More preferably, the copolymer is a poly(2-dimethylaminoethyl methacrylate)-poly(ethylene glycol)-poly(2-dimethylaminoethyl methacrylate)block copolymer, a poly(glycerol methacrylate)-poly((2-methoxyethyl)acrylate)-poly(glycerol methacrylate)block copolymer, a poly(2-dimethylaminoethyl methacrylate)-poly(dimethylsiloxane)-poly(2-dimethylaminoethyl methacrylate)block copolymer, a poly (N,N-dimethyl-acrylamide)-[poly(2-methoxyethyl)acrylate)-poly (tert-butyl acrylate)]-poly(N,N-dimethyl acrylamide)block copolymer, a [poly(N,N-dimethyl acrylamide)-poly(methyl methacrylate)]-poly((2-methoxyethyl)acrylate)-[poly(N,N-dimethyl acrylamide)-poly(methyl methacrylate)]block copolymer or a poly(N,N-dimethyl acrylamide)-poly ((2-methoxyethyl) acrylate)-poly(N,N-dimethyl acrylamide) block copolymer.

The block copolymers of the invention may have further polymer chains grafted onto the core polymer and/or one or more (or all) of the flanking polymers. Suitable polymer chains for grafting onto the block copolymers include, for example, silicones, and polymers derived from monomers such as acrylate and methacrylate esters (eg, esters of acrylic or methacrylic acid with $C_1$–$C_8$ straight or branched chain alcohols), styrene (optionally substituted with one or more $C_1$–$C_{12}$ straight or branched chain alkyl groups) and mixtures thereof. Other suitable polymer chains include polyalkyleneglycols, such as polyethyleneglycol or polypropyleneglycol. The polymer chains which may be grafted onto the block copolymers may be hydrophobic or hydrophilic or mixtures of hydrophobic and hydrophilic chains may be grafted onto the block copolymers. Suitable hydrophobic and hydrophilic macromers for the grafts are described in WO 95/06078.

ABA Block Copolymers

The preferred polymers for use in the present invention are ABA block copolymers. As used herein, "A-B-A block copolymer" refers to a polymer comprising at least three segments having at least two differing compositions and also having any one of a number of different architectures, where the monomers are not incorporated into the polymer architecture in a solely statistical or uncontrolled manner. The transition from each A block to B block may be sharply defined or may be tapered (ie, there may be a gradual compositional change from A to B blocks). Although there may be two, three, four or more monomers in a single block-type polymer architecture, it will still be referred to herein as a block copolymer. In some embodiments, the block copolymers of this invention include one or more blocks of random copolymer (referred to herein as an "R" block) together with one or more blocks of single monomers. Thus, the polymer architecture may be A-R-A, R-B-R, R-B-A, R-R'-R, A-R-B-A or A-R-B-R-A, where R and R' are random blocks of monomers A and B or of monomers B and C or more monomers. Moreover, the random block can vary in composition or size with respect to the overall block copolymer. In some embodiments, for example, the random block will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics. Any of the monomers listed elsewhere in this specification may be used in the block copolymers of this invention.

A "block" within the scope of the block copolymers of this invention typically comprises about 5 or more monomers of a single type (with the random blocks being defined by composition and/or weight percent, as described above). In preferred embodiments, the number of monomers within a single block may be about 10 or more, about 15 or more, about 20 or more or about 50 or more. Each block may have a desired architecture and thus, each block may be linear, branched (with short or long chain branches), star (with 3 or more arms), etc. Other architectures will be apparent to those of skill in the art upon review of this specification.

In one embodiment, block copolymers are assembled by the sequential addition of different monomers or monomer mixtures to living polymerization reactions. In another embodiment, the addition of a pre-assembled functionalized block (such as a telechelic oligomer or polymer) to a free radical polymerization mixture yields a block copolymer (e.g., the polymerization mixture may be controlled or "living"). Ideally, the growth of each block occurs with high conversion. Conversions are determined by NMR via integration of polymer to monomer signals. Conversions may also be determined by size exclusion chromatography (SEC) via integration of polymer to monomer peak. For UV detection, the polymer response factor must be determined for each polymer/monomer polymerization mixture. Typical conversions can be 50% to 100% for each block, more specifically in the range of from about 60% to about 90%). Intermediate conversion can lead to block copolymers with a random copolymer block separating the two or more homopolymer blocks, depending on the relative rates of polymerization and monomer addition. At high conversion, the size of this random block is sufficiently small such that it is less likely to affect polymer properties such as phase separation, thermal behaviour and mechanical modulus. This fact can be intentionally exploited to improve polymerization times for many applications without measurably affecting the performance characteristics of the resulting polymer. This is achieved by intentionally "killing" or terminating the living nature of the polymerization when a desired level of conversion (e.g., >80%) is reached by, e.g., cooling the polymerization to room temperature or by neutralizing the control agent, for example by introducing acids, bases, oxidizing agents, reducing agents, radical sources, scavengers, etc. In the absence of a radical control agent, the polymerization continues uncontrolled (typically at much higher reaction rates) until the remaining monomer is consumed.

When the block copolymer contains a polysiloxane, it may be formed in the presence of an atom transfer radical initiator via a nucleophilic displacement reaction between the nucleophilic end-groups on the polysiloxane and leaving groups on the other polymers respectively. The nucleophilic displacement reaction of the second reaction step may be carried out under conventional reaction conditions. This process is described in more detail in International publications nos. WO 00/71606 and WO 00/71607.

A typical polysiloxane block copolymer obtainable by the process described above is built up from units of the general formula [A]L[B], in which A is a polymeric block built up from radically polymerisable monomer, B is a polysiloxane block and L is a divalent linker group which links the A and B blocks via O—Si, N—Si or S—Si bonds to the B block. Preferably L is selected from:

—$R^{15}$—C(O)—O—;
—$R^{15}$—O—C(O)—O—;
—$R^{15}$—C(O)—N($R^{16}$)—;
—$R^{15}$—O—C(O)—N($R^{16}$)—, or
—$R^{15}$—N($R^{16}$)—C(O)—N($R^{17}$)—;

in which $R^{15}$ is a divalent, optionally substituted, linear or branched $C_{1-18}$ hydrocarbon radical as described above, and
$R^{16}$ and $R^{17}$ are independently selected from monovalent, optionally substituted, linear or branched $C_{1-18}$ hydrocarbon radicals as described above.

The overall molecular architecture of the silicone block copolymers of the invention can be described by the formulas A-L-B, A-L-B-L-A, -(A-L-B)$_n$-, wherein n is an integer of 2 or greater, or [A-L-][A-L-]B[-L-A][-L-A], wherein A-L-B represents a diblock structure, A-L-B-L-A represents a triblock structure, -(A-L-B)$_n$- represents a multiblock structure, and [A-L-][A-L-]B[-L-A][-L-A] represents a dendritic structure.

The existence of a block copolymer according to this invention is determined by methods known to those of skill in the art. For example, those of skill in the art may consider nuclear magnetic resonance (NMR) studies of the block copolymer. Those of skill in the art would also consider the measured increase of molecular weight upon addition of a second monomer to chain-extend a living polymerization of a first monomer. Block copolymer structure can be suggested by observation microphase separation, including long range order (determined by X-ray diffraction), microscopy and/or birefringence measurements. Other methods of determining the presence of a block copolymer include mechanical property measurements, (e.g., elasticity of soft/hard/soft block copolymers), thermal analysis and chromatography (e.g., absence of homopolymer).

Measurement of optical properties, such as absorbance (color and clarity), provides information about the phase morphology and microstructure of the polymer emulsions. Thus, for example, birefringence measurements may indicate the presence of optical anisotropy resulting from microphase separation in hard/soft block copolymers. Likewise, sharp color delineations in optical micrographs of annealed polymer films can indicate the presence of ordered, microphase-separated block copolymer structure.

Block copolymers of sufficiently high molecular weight phase separate on a microscopic scale, to form periodically arranged microdomains which typically comprise predominantly one or the other polymer. These may take the form of lamellae, cylinders, spheres, and other more complex morphologies, and the domain sizes and periods are typically in the range 10–100 nm. Such microphase separation can be detected obtained in a variety of ways, including electron microscopy, x-ray or neutron scattering or reflectivity, measurement of optical anisotropy, and rheological measurements. The absence of a periodic microstructure is not necessarily evidence against having synthesized a block copolymer, as such absence may be due to low molecular weight, broad molecular weight distribution of the individual blocks, weak intermolecular interactions, or inadequate time and slow kinetics for microphase separation. However, the presence of a periodic microstructure on the 10–100 nm scale is considered extremely compelling evidence for block copolymer formation in accord with this invention. A periodic microstructure is not, however, an essential feature of the copolymers which may be used in the compositions of this invention.

Block copolymers are well-known to form terraced films, where the film thickness is restricted to integer or half-integer multiples of the microstructure period. This occurs because preferential interactions of one or the other block with the substrate and/or free surface cause a layering of the microdomains parallel to the film surface (see for example G. Coulon, D. Ausserre, and T. P. Russell, *J. Phys. (Paris)* 51, 777 (1990); and T. P. Russell, G. Coulon, V. R. Deline, and D. C. Miller, *Macromolecules* 22, 4600–6 (1989)). When observed in a reflection microscope (on a reflecting substrate such as a silicon wafer), the terracing manifests itself as a series of discrete, well-defined colors with sharp boundaries between them. The colors are a result of interference between light reflected from the top and bottom surfaces of the film, and depend on the local film thickness ("Newton's rings"). If terracing does not occur, the colors blend continuously from one into the other.

The presence of chemically homogeneous sequences within block copolymers leads to a phase transition known as microphase separation. Energetically unfavorable interactions between chemically distinct monomers drive the blocks to separate into spatially distinct domains. Since the blocks are covalently bound together, these domains are comparable in size to the dimensions of the polymers themselves. The presence of these domains alters the physical properties of the materials, giving the resulting composite many of the chemical and physical characteristics of each block.

Polymerisation Process

Although any conventional method can be used for the synthesis of the block copolymers of the invention, living free radical polymerisation is a preferred polymerisation process. Such polymerisations are described in the literature, for example: Tailored polymers by free radical processes, E Rizzardo et al, Macromol. Symp. 1999, 143 (World Polymer Congress, 37$^{th}$ International Symposium on Macromolecules, 1998), 291–307, ISSN: 102–1360: also Atom transfer radical polymerisation and controlled radical polymerisation, Z Zhang, et al, Gaofenzi Tongabo, 1999, (3) 138–144; K Matyjazewski, Classification and comparison of various controlled/"living" radical polymerisations, Book of Abstracts, 218$^{th}$ ACS National Meeting, New Orleans, Aug. 22–26, 1999, Poly-042.

In principle, any "living" free radical polymerisation techniques such as nitroxide radical controlled, atom transfer radical polymerisation (ATRP), reversible addition fragmentation chain transfer (RAFT) and catalytic chain transfer (CCT) could be used. Some of the preferred polymerisation routes for the block copolymers used in this invention are nitroxide mediated processes. Thus, a bis-nitroxide initiator may be employed to produce well-defined ABA block copolymers. The process comprises two steps. In the first step, a core polymer of a defined length is synthesised with the bis-nitroxide initiator at the "centre" of the core polymer. This involves the living polymerisation of the monomer or monomers with a bis-nitroxide initiator. After this first stage is complete, the core polymer is optionally purified or used without purification. The second step involves the introduction of the flanking polymer monomer or monomers using the same technique of living polymerisation. The polymerisation process can be closely monitored by gel permeation chromatography (GPC), NMR and viscosity measurements. The polymerisation process is preferably stopped when high conversions are achieved.

Other preferred polymerisation routes for the block copolymers used in this invention involve the preparation of a macroinitiator of the core polymer and the subsequent formation of the desired block copolymer in an atom transfer radical polymerisation reaction.

Living free radical polymerisation techniques suitable for use in the preparation of polymers for use in the invention include, for example, those described in Hawker et al., "Development of a Universal Alkoxyamine for 'Living' Free Radical Polymerizations," *J. Am. Chem. Soc.,* 1999, 121 (16), pp. 3904–3920 for a nitroxide mediated processes and in U.S. patent application Ser. No. 09/520,583, filed Mar. 8, 2000 and corresponding international application PCT/

US00/06176, which process is particularly preferred and both of these applications are incorporated herein by reference.

Suitable polymerisation reactions include, for example, the following ratios of starting materials, temperature, pressure, atmosphere and reaction time. Temperatures for polymerization are typically in the range of from about 0° C. to about 130° C., more preferably in the range of from about 20° C. to about 130° C. and even more preferably in the range of from about 25° C. to about 130° C. The atmosphere may be controlled with an inert atmosphere being preferred, such as nitrogen or argon. The molecular weight of the polymer can be controlled via controlled free radical polymerization techniques or by controlling the ratio of monomer to initiator. Generally, the ratio of monomer to initiator is in the range of from about 200 to about 800. In a nitroxide radical controlled polymerization the ratio of control agent to initiator can be in the range of from about 1 mol % to about 10 mol % and this is preferred. The polymerization may be carried out in bulk or in a suitable solvent such as diglyme. Polymerization reaction time may be in the range of from about 0.5 hours to about 72 hours, preferably from about 1 hour to about 24 hours and more preferably from about 2 hours to about 12 hours.

The polymers used in the present invention are preferably produced by the living free radical process.

Compositions of the Invention

Compositions of the present invention are preferably formulated into fabric care compositions comprising a solution, dispersion or emulsion comprising a thermoplastic elastomer and a textile compatible carrier for use in part of a laundering process. The laundering process may be a large scale or small-scale (e.g. domestic) process. When the laundering process is a domestic process, the composition may be packaged and labelled for this use.

The polymer composition comprises a thermoplastic elastomer as described above. The composition may contain other components, for example other polymers which impart benefits to a fabric. Preferably, the composition comprises from 0.1 to 20% by weight of the thermoplastic elastomer.

Conveniently, the thermoplastic polymers have a molecular weight of from 1,000 to 2,000,000, preferably from 2,000 to 1,000,000 and most preferably from 3,000 to 500,000.

In the present invention, the thermoplastic elastomer is applied to a fabric such that from 0.01% to 2% by weight on weight of fabric of the thermoplastic elastomer is coated onto the fabric. Advantageously, lower levels of thermoplastic elastomer can be applied eg, from 0.01% to 1.5% preferably 0.01% to 1%, more preferably 0.1% to 1%. Generally, the thermoplastic elastomer will at least partially coat individual fibres. At these levels of application, the physical properties of the fabric which make it suitable for use in a garment are retained (ie. the overall feel and appearance of the fabric remains substantially unchanged) but, unexpectedly, the fabric has improved crease recovery properties and/or elasticity and/or shape retention.

The crease recovery properties of a fabric treated according to the present invention are improved relative to fabric not so treated. Treatment of the fabric typically reduces the tendency of the fabric to remain creased. Thus, following treatment according to the invention, the crease recovery angle, which is a measure of the degree to which a fabric returns to its original shape following creasing, increases. The fabric may still require a degree of treatment (eg, by ironing) to reduce its creasing after washing and drying in a conventional domestic laundering process. However, the amount of crease reduction by ironing required for fabric treated according to the invention will typically be less than that required by untreated fabric. It will be appreciated that any reduction in the amount of crease reduction, such as ironing, which is required, is beneficial.

The method of the invention preferably comprises the step of applying a composition of the thermoplastic elastomer to a fabric. The solution may be applied to the fabric by conventional methods such as dipping, spraying or soaking, for example.

The fabric care composition of the invention comprises a solution, dispersion or emulsion comprising a thermoplastic elastomer and a textile compatible carrier. The textile compatible carrier facilitates contact between the fabric and the thermoplastic elastomer. The textile compatible carrier may be water, low molecular weight polyols or alcohols (e.g. ethanol, isopropanol or glycol) or a surfactant. However, when it is water, it is preferred that a perfume is present. In a composition that is used during the washing or rinse cycles of a washing machine, it is highly preferable if the textile compatible carrier is a cationic surfactant, more preferably a cationic softening agent.

If the fabric care composition of the invention is in the form of a dispersion or emulsion of the thermoplastic elastomer or if, in the method of the invention, a dispersion or emulsion of the thermoplastic elastomer is used, the fabric treated with the composition may need to be heated to a temperature above the Tg of the hard blocks of the elastomer in order to obtain the advantages of the invention. The heating of the treated fabric can be carried out as a separate heating step or may form part of the laundering process eg taking place during drying of the fabric (for example in a tumble dryer) or, more preferably, during ironing of the fabric. Alternatively, a plasticiser or coalescing agent may be used to lower the Tg of the thermoplastic elastomer in order to avoid the need for heating or to reduce the temperature of the heating step required to obtain the advantages of the invention.

The method of the invention may be carried out as a treatment of the fabric before or after it has been made into garments, as part of an industrial textile treatment process. Alternatively, it may be provided as a spray composition eg, for domestic (or industrial) application to fabric in a treatment separate from a conventional domestic laundering process.

Alternatively, in the method of the invention, the treatment is carried out as part of a laundering process. Suitable laundering processes include large scale and small-scale (eg domestic) processes. Such a process may involve the use of a fabric care composition of the invention, for example. The fabric care composition of the invention may be a main wash detergent composition, in which case the textile compatible carrier may be a detergent and the composition may contain other additives, which are conventional in main wash detergent compositions. Alternatively, the fabric care composition may be adapted for use in the rinse cycle of a domestic laundering process, such as a fabric conditioning composition or an adjunct, and the textile compatible carrier may be a fabric conditioning compound (such as a quaternary alkylammonium compound) or simply water, and conventional additives such as perfume may be present in the composition.

It is advantageous in compositions for use in a domestic setting to further comprise a plasticiser. In the context of this invention, a plasticiser is any material that can modify the flow properties of the thermoplastic elastomer. Suitable plasticisers include $C_{12}$–$C_{20}$ alcohols, glycol ethers, phthalates and automatic hydrocarbons. It is also highly advantageous, if the compositions comprise a perfume.

Detergent Active Compounds

If the fabric care composition of the present invention is in the form of a detergent composition, the textile compatible carrier may be chosen from soap and non-soap anionic, cationic, nonionic, amphoteric and zwitterionic detergent active compounds, and mixtures thereof.

Many suitable detergent active compounds are available and are fully described in the literature, for example, in "Surface-Active Agents and Detergents", Volumes I and II, by Schwartz, Perry and Berch.

The preferred textile compatible carriers that can be used are soaps and synthetic non-soap anionic and nonionic compounds.

Anionic surfactants are well known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Cationic surfactants that may be used include quaternary ammonium salts of the general formula $R_1R_2R_3R_4N^+X^-$ wherein the R groups are independently hydrocarbyl chains of $C_1$–$C_{22}$ length, typically alkyl, hydroxyalkyl or ethoxylated alkyl groups, and X is a solubilising cation (for example, compounds in which $R_1$ is a $C_3$–$C_{22}$ alkyl group, preferably a $C_3$–$C_{10}$ or $C_{12}$–$C_{14}$ alkyl group, $R_2$ is a methyl group, and $R_3$ and $R_4$, which may be the same or different, are methyl or hydroxyethyl groups): and cationic esters (for example, choline esters) and pyridinium salts.

The total quantity of detergent surfactant in the composition is suitably from 0.1 to 60 wt % e.g. 0.5–55 wt % such as 5–50 wt %.

Preferably, the quantity of anionic surfactant (when present) is in the range of from 1 to 50% by weight of the total composition. More preferably, the quantity of anionic surfactant is in the range of from 3 to 35% by weight, e.g. 5 to 30% by weight.

Preferably, the quantity of nonionic surfactant when present is in the range of from 2 to 25% by weight, more preferably from 5 to 20% by weight.

Amphoteric surfactants may also be used, for example amine oxides or betaines.

The compositions may suitably contain from 10 to 70%, preferably from 15 to 70% by weight, of detergency builder. Preferably, the quantity of builder is in the range of from 15 to 50% by weight.

The detergent composition may contain as builder a crystalline aluminosilicate, preferably an alkali metal aluminosilicate, more preferably a sodium aluminosilicate.

The aluminosilicate may generally be incorporated in amounts of from 10 to 70% by weight (anhydrous basis), preferably from 25 to 50%. Aluminosilicates are materials having the general formula:

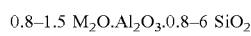

0.8–1.5 $M_2O.Al_2O_3.0.8$–6 $SiO_2$ where M is a monovalent cation, preferably sodium. These materials contain some bound water and are required to have a calcium ion exchange capacity of at least 50 mg CaO/g. The preferred sodium aluminosilicates contain 1.5–3.5 $SiO_2$ units in the formula above. They can be prepared readily by reaction between sodium silicate and sodium aluminate, as amply described in the literature.

Fabric Softening and/or Conditioner Compounds

If the fabric care composition of the present invention is in the form of a fabric conditioner composition, the textile compatible carrier will be a fabric softening and/or conditioning compound (hereinafter referred to as "fabric softening compound"), which may be a cationic or nonionic compound.

The softening and/or conditioning compounds may be water insoluble quaternary ammonium compounds. The compounds may be present in amounts of up to 8% by weight (based on the total amount of the composition) in which case the compositions are considered dilute, or at levels from 8% to about 50% by weight, in which case the compositions are considered concentrates.

Compositions suitable for delivery during the rinse cycle may also be delivered to the fabric in the tumble dryer if used in a suitable form. Thus, another product form is a composition (for example, a paste) suitable for coating onto, and delivery from, a substrate e.g. a flexible sheet or sponge or a suitable dispenser during a tumble dryer cycle.

Suitable cationic fabric softening compounds are substantially water-insoluble quaternary ammonium materials comprising a single alkyl or alkenyl long chain having an average chain length greater than or equal to $C_{20}$ or, more preferably, compounds comprising a polar head group and two alkyl or alkenyl chains having an average chain length greater than or equal to $C_{14}$. Preferably the fabric softening compounds have two long chain alkyl or alkenyl chains each having an average chain length greater than or equal to $C_{16}$. Most preferably at least 50% of the long chain alkyl or alkenyl groups have a chain length of $C_{18}$ or above. It is preferred if the long chain alkyl or alkenyl groups of the fabric-softening compound are predominantly linear.

Quaternary ammonium compounds having two long-chain aliphatic groups, for example, distearyldimethyl ammonium chloride and di(hardened tallow alkyl) dimethyl ammonium chloride, are widely used in commercially available rinse conditioner compositions. Other examples of these cationic compounds are to be found in "Surface-Active Agents and Detergents", Volumes I and II, by Schwartz, Perry and Berch. Any of the conventional types of such compounds may be used in the compositions of the present invention.

The fabric softening compounds are preferably compounds that provide excellent softening, and are characterised by a chain melting $L\beta$ to $L\alpha$ transition temperature greater than 25° C., preferably greater than 35° C., most preferably greater than 45° C. This $L\beta$ to $L\alpha$ transition can be measured by DSC as defined in "Handbook of Lipid Bilayers", D Marsh, CRC Press, Boca Raton, Fla., 1990 (pages 137 and 337).

Substantially water-insoluble fabric softening compounds are defined as fabric softening compounds having a solubility of less than $1\times10^{-3}$ wt % in demineralised water at 20° C. Preferably the fabric softening compounds have a solubility of less than $1\times10^{-4}$ wt %, more preferably less than $1\times10^{-8}$ to $1\times10^{-6}$ wt %.

Especially preferred are cationic fabric softening compounds that are water-insoluble quaternary ammonium materials having two $C_{12-22}$ alkyl or alkenyl groups connected to the molecule via at least one ester link, preferably two ester links. An especially preferred ester-linked quaternary ammonium material can be represented by the formula II:

wherein each $R_1$ group is independently selected from $C_{1-4}$ alkyl or hydroxyalkyl groups or $C_{2-4}$ alkenyl groups; each $R_2$ group is independently selected from $C_{8-28}$ alkyl or alkenyl groups; and wherein $R_3$ is a linear or branched alkylene group of 1 to 5 carbon atoms, T is

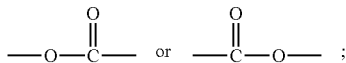

and p is 0 or is an integer from 1 to 5.

Di(tallowoxyloxyethyl) dimethyl ammonium chloride and/or its hardened tallow analogue is especially preferred of the compounds of formula (II).

A second preferred type of quaternary ammonium material can be represented by the formula (III):

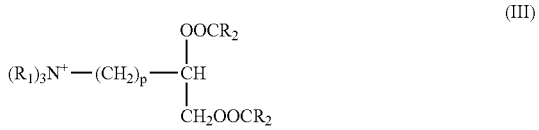

wherein $R_1$, p and $R_2$ are as defined above.

It is advantageous if the quaternary ammonium material is biologically biodegradable.

Preferred materials of this class such as 1,2-bis(hardened tallowoyloxy)-3-trimethylammonium propane chloride and their methods of preparation are, for example, described in U.S. Pat. No. 4,137,180 (Lever Brothers Co). Preferably these materials comprise small amounts of the corresponding monoester as described in U.S. Pat. No. 4,137,180, for example, 1-hardened tallowoyloxy-2-hydroxy-3-trimethylammonium propane chloride.

Other useful cationic softening agents are alkyl pyridinium salts and substituted imidazoline species. Also useful are primary, secondary and tertiary amines and the condensation products of fatty acids with alkylpolyamines.

The compositions may alternatively or additionally contain water-soluble cationic fabric softeners, as described in GB 2 039 556B (Unilever).

The compositions may comprise a cationic fabric softening compound and an oil, for example as disclosed in EP-A-0829531.

The compositions may alternatively or additionally contain nonionic fabric softening agents such as lanolin and derivatives thereof.

Lecithins are also suitable softening compounds.

Nonionic softeners include Lβ phase forming sugar esters (as described in M Hato et al Langmuir 12, 1659, 1666, (1996)) and related materials such as glycerol monostearate or sorbitan esters. Often these materials are used in conjunction with cationic materials to assist deposition (see, for example, GB 2 202 244). Silicones are used in a similar way as a co-softener with a cationic softener in rinse treatments (see, for example, GB 1 549 180).

The compositions may also suitably contain a nonionic stabilising agent. Suitable nonionic stabilising agents are linear $C_8$ to $C_{22}$ alcohols alkoxylated with 10 to 20 moles of alkylene oxide, $C_{10}$ to $C_{20}$ alcohols, or mixtures thereof.

Advantageously the nonionic stabilising agent is a linear $C_8$ to $C_{22}$ alcohol alkoxylated with 10 to 20 moles of alkylene oxide. Preferably, the level of nonionic stabiliser is within the range from 0.1 to 10% by weight, more preferably from 0.5 to 5% by weight, most preferably from 1 to 4% by weight. The mole ratio of the quaternary ammonium compound and/or other cationic softening agent to the nonionic stabilising agent is suitably within the range from 40:1 to about 1:1, preferably within the range from 18:1 to about 3:1.

The composition can also contain fatty acids, for example, $C_3$ to $C_{24}$ alkyl or alkenyl monocarboxylic acids or polymers thereof. Preferably saturated fatty acids are used, in particular, hardened tallow $C_{16}$ to $C_{18}$ fatty acids. Preferably the fatty acid is non-saponified, more preferably the fatty acid is free, for example oleic acid, lauric acid or tallow fatty acid. The level of fatty acid material is preferably more than 0.1% by weight, more preferably more than 0.2% by weight. Concentrated compositions may comprise from 0.5 to 20% by weight of fatty acid, more preferably 1% to 10% by weight. The weight ratio of quaternary ammonium material or other cationic softening agent to fatty acid material is preferably from 10:1 to 1:10.

The fabric conditioning compositions may include silicones, such as predominately linear polydialkylsiloxanes, e.g. polydimethylsiloxanes or aminosilicones containing amine-functionalised side chains; soil release polymers such as block copolymers of polyethylene oxide and terephthalate: amphoteric surfactants: smectite type inorganic clays; zwitterionic quaternary ammonium compounds and nonionic surfactants.

The fabric conditioning compositions may also include an agent, which produces a pearlescent appearance, e.g. an organic pearlising compound such as ethylene glycol distearate, or inorganic pearlising pigments such as microfine mica or titanium dioxide ($TiO_2$) coated mica.

The fabric conditioning compositions may be in the form of emulsions or emulsion precursors thereof.

Other optional ingredients include emulsifiers, electrolytes (for example, sodium chloride or calcium chloride) preferably in the range from 0.01 to 5% by weight, pH buffering agents, and perfumes (preferably from 0.1 to 5% by weight).

Further optional ingredients include non-aqueous solvents, perfume carriers, fluorescers, colourants, hydrotropes, antifoaming agents, antiredeposition agents, enzymes, optical brightening agents, opacifiers, dye transfer inhibitors, anti-shrinking agents, anti-wrinkle agents, anti-spotting agents, germicides, fungicides, anti-oxidants, UV absorbers (sunscreens), heavy metal sequestrants, chlorine scavengers, dye fixatives, anti-corrosion agents, drape imparting agents, antistatic agents and ironing aids. This list is not intended to be exhaustive.

Fabric Treatment Products

The fabric care composition of the invention may be in the form of a liquid, solid (e.g. powder or tablet), a gel or paste, spray, stick or a foam or mousse. Examples including a soaking product, a rinse treatment (e.g. conditioner or finisher) or a mainwash product. The composition may also be applied to a substrate e.g. a flexible sheet or used in a dispenser which can be used in the wash cycle, rinse cycle or during the dryer cycle.

The present invention has the advantage not only of increasing the crease recovery angle and/or elasticity and/or shape retention of a fabric but also of improving the tensile strength of the fabric. The tensile strength of fabrics has in the past been increased by, for example, including fibres of a thermoplastic elastomer, such as Lycra (trade mark) yarns, in the fabric itself. It was unexpected that coating the fibres with a thermoplastic elastomer, according to the invention, could provide improved crease resistance, elasticity and/or shape retention and increased tensile strength. The effect was particularly surprising because a number of conventional treatments for improving the crease resistance of fabrics can have the opposite effect of reducing the tensile strength of the fabric, particularly where the treatment involves cross-linking of the fabric.

It is preferable if after application of compositions according to the invention a curing process takes place such as ironing or tumble drying.

The following non-limiting examples illustrate the invention.

EXAMPLES

Synthesis and Characterisation

The synthesis and characterisation of the polymers was carried out according to the following general procedures.

In the following examples, the following abbreviations are used:
PEG=poly(ethylene glycol)
MMA=methyl methacrylate
MEA=(2-methoxyethyl)acrylate
GMA=Glycerol methacrylate
DMAEMA=2-dimethylaminoethyl methacrylate
tBu=tert.-butyl acrylate
DMA=N,N-dimethylacrylamide
PDMS=polydimethylsiloxane Synthesis:

Example 1

Synthesis of P(DMA)-P(MEA)-P(DMA) Copolymer

Synthesis 1. bis-initiator

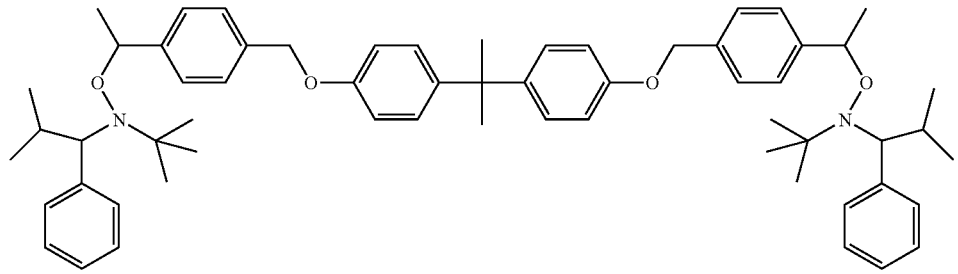

2. free nitroxide

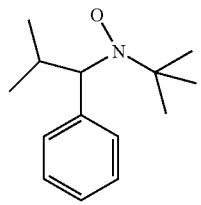

3. monomer for midblock (B block)
2-methoxyethyl acrylate (MEA)

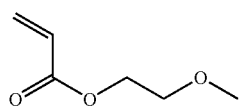

4. monomer for endblock

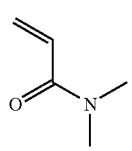

N,N-dimethylacrylamide (DMA)

5. Preparation of midblock (B block)

Bis-initiator (0.5557 g, 0.6147 mmol), MEA (40.00 g, 307.36 mmol) and free nitroxide (2.70 mg, 0.0123 mmol) were mixed in a 200 mL flask under argon, and heated at 125° C. with vigorous stirring for 5 hrs, then cooled to room temperature. The conversion was 77% as measured by $^1$H-NMR. The reaction mixture was dissolved in acetone (60 mL), and precipitated into hexane (600 mL). The polymer was collected and dried under vacuum at 45° C., affording a clear viscous liquid (30.08 g).

6. Preparation of triblock copolymer (ABA)

Midblock polymer (30.08 g), diglyme (30 g) DMA (38.20 g) and free nitroxide (2.70 mL, 2.0 mg/mL solution in diglyme) were mixed in a 250 mL flask under argon. The mixture was stirred and heated at 125° C. for 4 hrs, then cooled to room temperature. The mixture was dissolved in acetone (100 mL), and precipitated into hexane (600 mL). The precipitation process was repeated once. The triblock copolymer was collected and dried under vacuum (50 g).

From these polymerisation methods, it will be evident to those of skill in the art that linking atoms may exist between the A and B blocks. These linking atoms are typically artefacts of the particular polymerisation mechanism employed. The presence of the linking atoms does not necessarily affect the properties of the block copolymers of the invention and polymers containing linking atoms are not intended to be excluded from the definition of the block copolymers no matter which formula is used, such as A-B-A, A-R-A, etc.

Example 2

Synthesis of PDMAEMA-PEG-PDMAEMA (a) Preparation of poly(ethylene alycol) macroinitiator Poly(ethylene glycol), MW=1000, ex Polysciences Inc. (20 g, 0.02 moles) was dissolved in anhydrous toluene (100 ml) in a 2-necked round bottom flask fitted with a suba seal and calcium chloride guard tube. 4-(Dimethylamino)pyridine (0.054 g, 4.4×10$^{-4}$ moles), triethylamine (4.45 g, 0.044 moles) and a magnetic stirrer bar were added to the PEG solution. 2-Bromoisobutyryl bromide (10.12 g, 0.044 moles) was added dropwise via a syringe through the suba seal, which caused the initially clear solution to turn to a milky suspension. After stirring at ambient overnight, the toluene was removed by evaporation using a rotary evaporator and the remaining brown liquid was dissolved in dichloromethane (200 ml). This solution was added to a separating funnel and washed successively with saturated sodium bicarbonate solution (100 ml), 1 M hydrochloric acid (100 ml) and brine (100 ml). The dichloromethane layer was then dried over magnesium sulfate, filtered and the solvent evaporated. After drying overnight under vacuo the product was obtained as a brown oil (19.25 g, 73.1% yield).

Reaction scheme 1:

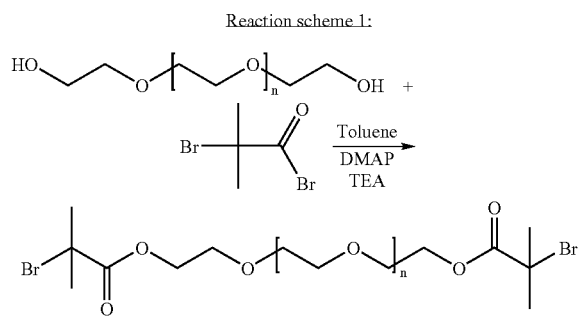

Characterisation:

IR: 1734 cm$^{-1}$ (s, saturated ester carbonyl)

NMR ($^1$H-CDCl$_3$): 1.94 (d, ester CH$_3$, 12H); 3.64 (s, PEG CH$_2$, 80H); 3.73 (t, CH$_2$—O, 4H); 4.33 (t, CH$_2$—O, 4H).

(b) Preparation of PDMAEMA-PEG-PDMAEMA Block Copolymers 2-(Dimethylamino)ethyl methacrylate (ex Aldrich) (15.41 g, 0.098 moles, the amount required to give a theoretical molecular weight of 5000) and the PEG-macroinitiator (2 g, 1.54×10$^{-3}$ moles) were dissolved in demineralised water (20 ml) and added to a 3-necked 50 ml round bottom flask fitted with a magnetic stirrer bar, a thermometer, a N$_2$ inlet and a suba seal fitted with a gas outlet. Dry N$_2$ gas was bubbled through the solution for 45 minutes. Copper(I)bromide (0.221 g, 1.54×10$^{-3}$ moles) and 2,2'-dipyridyl (0.4866 g, 3.08×10$^{-3}$ moles) were weighed into a glass vial, mixed and added to the reaction mixture by lifting the thermometer from the flask's socket, replacing the thermometer immediately after addition of the solids. The reaction mixture turned to a brown colour on mixing the solids into solution, also an increase in viscosity was noted. A reaction exotherm of 28° C. was recorded over a time period of 6 minutes. After mixing for 2 hours under a N$_2$ blanket, the contents of the flask were poured into a beaker and diluted with water (100 ml). This solution was then poured through a bed of silica to remove the copper metal, which resulted in the initially dark green solution to become clear and almost water-white.

This aqueous solution was freeze-dried over the weekend yielding 15 g of slightly pink material.

Reaction scheme 2:

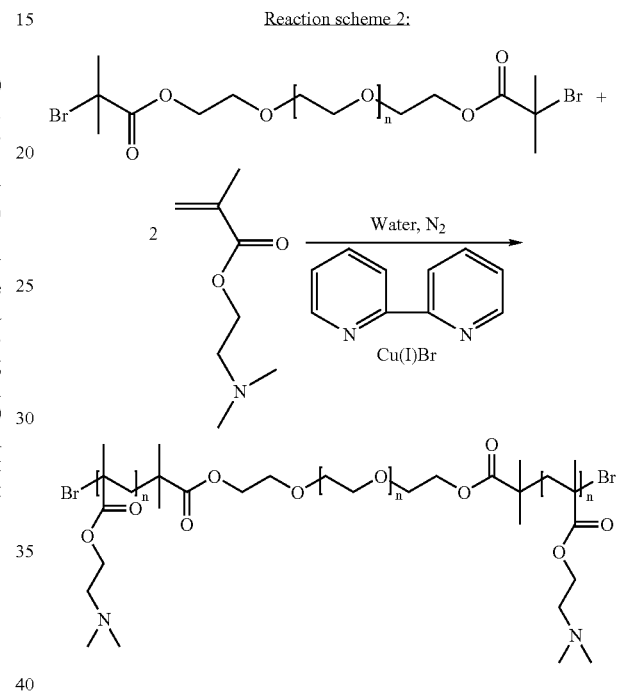

Characterisation:

IR: 1723 cm$^{-1}$ (s, saturated ester carbonyl)

NMR ($^1$H-CDCl$_3$): 2.3 (m, N—CH$_3$, 6H); 2.6 (s, N—CH$_2$, 2H); 3.65(s, O—CH$_2$—CH$_2$—O, 4H); 4.08 (s, CH$_2$—O, 2H).

GPC (eluent=THF; PMMA standards): Mn=9000; Mw=11900; Pdi=1.35

Example 3

Synthesis of PDMAEMA-PDMS-PDMAEMA (a) Preparation Method:

Cu(I)Br (0.2732 g, 1.905 mmol) along with a magnetic stirrer bar was placed in a dry Schlenk flask which was then evacuated and flushed with nitrogen three times. 2-dimethylaminoethyl methacrylate (3.9 mL, 0.023 moles), toluene (7.2 mL) and the PDMS initiator (1) (2 g, 0.952 mmol) were added to the Schlenk using degassed syringes. The solution was then deoxygenated by three freeze-pump-thaw cycles. Finally, once the flask had reached the desired reaction temperature of 900 C. the n-propyl-2-pyridinalmethanimine ligand (2) (0.54 mL, 3.809 mmol) was added with stirring. The reaction mixture immediately turned dark brown in colour on addition of the ligand.

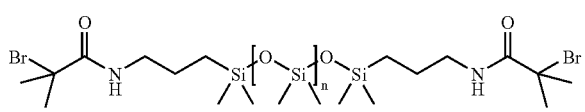

(1)

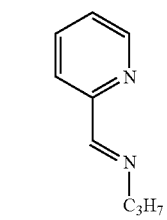

(2)

Target molecular weight of DMAEMA blocks=4000, molecular weight of initiator=2000 (total=6000). The ratio of [monomer]:[initiator] determines molecular weight of end polymer. In the described ATRP the required ratio of—[monomer]:[initiator]=25:1. The ratios for the other listed reagents are as follows; [Cu(I)Br]:[Initiator]=1:2, [Ligand]: [Cu(I)Br]=2:1 and solvent volume: monomer volume 2:1.

The monomer was purified by passing down a basic alumina column prior to use and purged with nitrogen for at least one hour. Toluene, which was used as a solvent for all polymerisations, was also degassed in this manner. Cu(I)Br was purified before use according to a published procedure.

1) Keller, R. N.; Wycoff, H. D. -Inorganic Synthesis, 1947, 2,1.

(b) Purification of Polymer

The resultant dark brown solution was passed down an alumina column several times using a conventional solvent such as dichloromethane or tetrahydrofuran. When the solution appeared colourless the solvent was removed under vacuum to yield a pale yellow solid.

Examples 4 to 10

The following polymers were also prepared according to methods analagous to the synthesis methods described in Examples 1 to 3 above.

Example 4: PDMAEMA-PEG-PDMAEMA

Example 5: P(GMA)-P(MEA)-(GMA)

Example 6: PDMAEMA-PDMS-PDMAEMA

Example 7: P(DMA)-[P(MEA)-P(tBu)]-P(DMA)

Example 8: {P(DMA)P(MMA}-P(MEA)-{P(DMA)P(MMA)}

Example 9: P(DMA)-P(MEA)-P(DMA)

Example 10: P(DMA)-P(MEA)-P(DMA)

Method for Determining Elastic Modulus

Modulus (E) was determined at 10 Hz, 1% strain, 25° C. in a simple tension geometry after two days of equilibration at 50% relative humidity, 25° C. Samples of polymer were molded at 120° C. into sheets 1.24 mm thick. This sheet was trimmed into a bar measuring 9.5×10 mm and mounted in the single cantilever test fixture of a Rheometric Scientific DMTA-IV dynamic mechanical thermal analyzer.

Method For Determining Viscosity

Viscosity (0) was estimated for 5 wt % polymer in 50 vol % aqueous ethanol solution at 25° C. using capillary viscometry and assuming a viscosity for deionized water of 1 cp.

Method For Determining Molecular Weights

Number average molecular weights (Mn) for midblock polymers are calculated from the monomer-to-initiator ratios, and the conversion of monomer as measured by NMR (generally about 80%), assuming the polymerization process is living. Mn for endblock polymers are calculated from monomer mole fractions and Mn values of midblock polymers. Monomer mole fractions are determined by NMR.

Molecular Weights of Polymers

| Polymer | MWt A Block | MWt B Block | Total Mwt | Comments |
|---------|-------------|-------------|-----------|----------|
| Ex 7    | 19 K        | 52 K        | 90 K      | B block contains ~10% tBu |
| Ex 8    | 25 K        | 49 K        | 81 K      | A block contains ~10% MMA |
| Ex 9    | 17 K        | 30 K        | 62 K      |          |
| Ex 10   | 21 K        | 44 K        | 86 K      |          |

Polydispersity of all polymers ca. 1.1–1.35

Example 11

Assessment of Shape Retention Benefits (Elasticity)

Each of the elastomers was applied to prewashed woven sheeting by pad application from an aqueous or aqueous ethanol solution at a level of 1% on weight of fabric. The dried sheets were ironed and then conditioned at 65% relative humidity and 20° C. for at least 24 hrs The fabric extension parameters defined below were measured using a Testometric tester when a sample is stretched and relaxed.

Sample size: 150 mm×50 mm cut on the bias
Area of stretching: 100 mm×25 mm
Elongation Rate: 100 mm/min
Measurement: Extend the fabric by 20 mm and return to 0 mm measuring the force Ability to Recover from Deformation (ARfD) is related to the force exerted by the fabric during recovery and is defined as the force exerted after recovering by 10 mm (RF10) normalised to that for untreated fabric ($RF10_o$).

$$ARID = \frac{RF10}{RF10_o}$$

Values greater than 1 show increased ability to recover from deformation compared to untreated fabric. The examples listed in Table 1 all displayed ArfD values greater than 1

TABLE 1

| Ex. No. | Name | ARfD |
|---------|------|------|
| 4 | 1% pdmaema-peg-pdmeama | 1.45 |
| 5 | 1% p(GMA)-P(MEA)-P(GMA) | 1.60 |
| 6 | 1% PDMAEMA-PDMS-POMAEMA | 2.39 |
| 7 | 1% P(DMA)-[P(MEA)-P(tBu)]-P(DMA) | 2.36 |

TABLE 1-continued

| Ex. No. | Name | ARfD |
|---|---|---|
| 8 | 1% {P(DMA)P(MMA)}-P(MEA)-{P(DMA)P(MMA)} | 2.63 |
| 9 | 1% P(DMA)-P(MEA)-P(DMA) | 2.85 |
| 10 | 1% P(DMA)-P(MEA)-P(DMA) | 3.22 |

The Residual Extension (RE) is defined as the extension during the recovery cycle at which the measured force drops below 0.006 kgf. All the examples listed in Table 2 showed a reduced residual extension (RE) relative to untreated fabric

TABLE 2

| Ex. No. | Name | RE |
|---|---|---|
| | Untreated Fabric | 8.82 |
| 4 | 1% pdmaema-peg-pdmeama | 8.48 |
| 5 | 1% p(GMA)-P(MEA)-P(GMA) | 8.42 |
| 6 | 1% PDMAEMA-PDMS-PDMAEMA | 7.23 |
| 7 | 1% P(DMA)-[P(MEA)-P(tBu)]-P(DMA) | 6.89 |
| 8 | 1% {P(DMA)P(MMA)}-P(MEA)-{P(DMA)P(MMA)} | 6.95 |
| 9 | 1% P(DMA)-P(MEA)-P(DMA) | 6.87 |
| 10 | 1% P(DMA)-P(MEA)-P(DMA) | 6.69 |

Example 12

Assessment of Wrinkle Recovery Benefits

The fabrics were prepared as described in Example 11 above, conditioned at 20° C., 65% relative humidity then the crease recovery angle (CRA) measured (using a modified method based on BS1553086). A sample of fabric (25 mm×50 mm) is folded in half forming a sharp crease and held under a weight of 1 kg for 1 minute. On releasing the sample the crease opens up to a certain degree. After 1 minute relaxation time the angle is measured. The fabric is tested in the warp direction only (hence maximum CRA is 180°). Higher CRAs correspond to less wrinkled fabrics.

| Ex. No. | Sample | Control CRA | Sample CRA |
|---|---|---|---|
| 5 | P(GMA)-P(MEA)-P(GMA) | 55 | 71 |
| 6 | P(DMAEMA)-PDMS-P(DMAEMA) | 55 | 78 |
| 8 | {P(DMA)P(MMA)}-P(MEA)-{P(DMA)P(MMA)} | 55 | 73 |
| 9 | P(DMA)-P(MEA)-P(DMA) | 66 | 79 |
| 10 | P(DMA)-P(MEA)-P(DMA) | 55 | 82.5 |

The invention claimed is:

1. A fabric care composition comprising:
   a) a thermoplastic elastomer which is a block copolymer comprising a core polymer which is a polymer of (2-methoxyethyl) acrylate, and two or more flanking polymers, wherein the flanking polymers are polymers of a $C_{1-4}$ alkyl methacrylate, each flanking polymer being covalently bound to an end of the core polymer, wherein the copolymer is soluble at a level of at least 1% by weight in water or aqueous ethanol at 25° C.;
   b) 10 to 70% by weight of a builder or from 8 to 50% of a substantially water insoluble quaternary ammonium compound; and
   c) a textile compatible carrier.

2. A composition as claimed in claim 1, wherein the core polymer has a Tg of from −150° C. to 50° C.

3. A composition as claimed in claim 1, wherein the flanking polymers have a Tg of from 30° C. to 150° C.

4. A composition as claimed in claim 1, wherein the block copolymer is linear or star-shaped.

5. A composition as claimed in claim 1, wherein the block copolymer is a linear ABA block copolymer.

6. A composition as claimed in claim 1, which comprises from 0.1 to 20% by weight of the block copolymer.

7. A composition as claimed in claim 1, wherein the core polymer has a weight average molecular weight of from 1 kDa to 500 kDa.

8. A composition as claimed in claim 1, wherein the flanking polymers have a weight average molecular weight of from 200 Da to 250 kDa.

9. A composition as claimed in claim 1, wherein the molar ratio of the core polymer to the flanking polymers is from 1:10 to 10:1.

10. A composition as claimed in claim 1, wherein the polymer has a viscosity of less than 15 cp as determined for 5 wt % polymer in 50 vol % aqueous ethanol solution at 25° C. using capillary viscometry and assuming a viscosity for deionised water of 1 mPas.

11. A composition as claimed in claim 1, wherein the block copolymer has an elastic modulus of less than 0.45 Gpa.

12. A composition as claimed in claim 1, which further comprises a fragrance or perfume.

13. A composition as claimed in claim 1, which is in a form suitable for spraying onto a fabric.

14. A method of treating fabric which comprises treating the fabric with a fabric care composition according to claim 1 as part of a laundering process.

15. A method as claimed in claim 14, wherein the fabric is treated with the composition during the wash or rinse cycle.

16. A method as claimed in claim 14, wherein the composition is applied to the fabric prior to drying and/or ironing.

17. A method of improving the crease recovery properties and/or elasticity and/or shape retention of a fabric which comprises treating the fabric with a thermoplastic elastomer as defined in claim 1.

18. A method of improving the crease recovery properties and/or elasticity and/or shape retention of a fabric which comprises treating the fabric with a composition according to claim 1.

* * * * *